United States Patent [19]

Chlanda

[11] Patent Number: 5,126,026
[45] Date of Patent: Jun. 30, 1992

[54] GUARD MEMBRANES FOR USE IN ELECTRODIALYSIS CELLS

[75] Inventor: Frederick P. Chlanda, Rockaway, N.J.

[73] Assignee: Allied-Signal Inc., Morris Township, Morris County, N.J.

[21] Appl. No.: 590,116

[22] Filed: Sep. 28, 1990

[51] Int. Cl.$^5$ .............................. B01D 13/02
[52] U.S. Cl. .......................... 204/182.4; 204/301; 204/252
[58] Field of Search .............. 204/301, 252, 182.4

[56] References Cited

U.S. PATENT DOCUMENTS

| | | | |
|---|---|---|---|
| 2,758,965 | 8/1956 | Block et al. | 204/301 |
| 2,810,686 | 10/1957 | Bodamer et al. | 204/301 |
| 2,829,095 | 4/1958 | Oda et al. | 204/98 |
| 3,220,941 | 11/1965 | Osborne | 204/301 |
| 3,310,481 | 3/1967 | Mock et al. | 204/182.4 |
| 3,510,418 | 5/1970 | Mitzutani et al. | 204/181 |
| 3,725,235 | 4/1973 | Mintz | 204/301 |
| 3,905,886 | 9/1974 | Wang | 204/180 |
| 4,012,324 | 3/1977 | Gregor | 210/500 |
| 4,024,043 | 5/1977 | Dege et al. | 204/296 |
| 4,057,483 | 11/1977 | Giuffrida | 204/301 |
| 4,116,889 | 9/1978 | Chlanda et al. | 521/27 |
| 4,217,200 | 8/1980 | Kedem et al. | 204/301 |
| 4,284,492 | 8/1981 | Karn | 204/301 |
| 4,391,680 | 7/1983 | Mani et al. | 204/98 |
| 4,504,373 | 3/1985 | Mani et al. | 204/180 P |
| 4,536,269 | 8/1985 | Chlanda et al. | 204/182.4 |
| 4,608,140 | 8/1986 | Goldstein | 204/182.3 |
| 4,608,141 | 8/1986 | Chlanda et al. | 204/182.5 |
| 4,738,764 | 4/1988 | Chlanda et al. | 204/296 |
| 4,740,281 | 4/1988 | Chlanda et al. | 204/151 |
| 4,766,161 | 8/1988 | Chlanda et al. | 521/27 |

FOREIGN PATENT DOCUMENTS

| | | |
|---|---|---|
| 2645044 | 10/1990 | France . |
| 0078603 | 5/1985 | Japan ............... 204/301 |
| 7900040 | 2/1979 | World Int. Prop. O. . |

OTHER PUBLICATIONS

Bull. Chem. Soc. JPN 38,689–694 (1965).
Synthetic Membrane: *Science, Engineering and Applications*, PM Buengay, HK Lonsdale, MN dePinho Dreidel Publ Co., Dordrecht Holland.

*Primary Examiner*—John Niebling
*Assistant Examiner*—Arun S. Phasge

[57] ABSTRACT

The present invention relates to an improved apparatus of the type containing membranes which are selectively permeable to ion transport and a related method. The apparatus comprises at least one guard membrane located adjacent to a first membrane. The apparatus comprises at least one unit cell comprising at least one first membrane having at least one ion selective layer selected from the group consisting of an anion selective layer and cation selective layer. There is at least one separate guard membrane adjacent to at least one first membrane.

30 Claims, 7 Drawing Sheets

GUARD MEMBRANES FOR USE IN ELECTRODIALYSIS CELLS

BACKGROUND OF THE INVENTION

1. Field of the Invention

This invention relates to an improved electrodialysis apparatus and method. More particularly, the invention is an apparatus and cell for use in such an apparatus, comprising at least one guard membrane located adjacent to a first membrane as a barrier.

2. Description of Related Art

Electrodialysis uses direct current as a means to cause the movement of ions in solutions. Electrodialysis processes are well known in the art and are typically carried out in a stack arrangement comprising a plurality of flat sheet membranes. The stack consists of electrodes (anode and cathode) at either end and a series of membranes and gaskets which are open in the middle to form a multiplicity of compartments separated by the membranes. Usually, a separate solution is supplied to the compartments containing the electrodes. Special membranes may be placed next to the electrode containing compartments in order to prevent mixing of the process streams with the electrode streams. The majority of the stack between the electrode compartments comprises a repeating series of units of different membranes with solution compartments between adjacent membranes. The repeating unit is called the unit cell, or simply, a cell. Solution is typically supplied to the compartments by internal manifolds formed as part of the gaskets or by a combination of internal and external manifolds. The stacks can include more than one type of unit cell. Streams may be fed from one stack to another in order to optimize process efficiency. Usually the change in composition of a stream after one pass through the stack is relatively small and the solutions can be recycled by being pumped to and from recycle tanks. Addition of fresh solution to and withdrawal of product from the recycle loop can be made either continuously or periodically in order to control the concentration of products in a desired range.

Treatment of aqueous salt streams by electrodialysis to form acid and/or base from the salt is known. The aqueous salt stream is fed to an electrodialytic water splitting apparatus which comprises an electrodialysis stack and a means for electrodialytically splitting water. A useful apparatus is disclosed in U.S. Pat. No. 4,740,281. A useful means to split water to (H+) and (OH−) is a bipolar membrane such as disclosed in U.S. Pat. No. 4,766,161. The bipolar membrane is comprised of anion selective and cation selective layers of ion exchange material. In order for the membrane to function as a water splitter, the layers must be arranged so that the anion layer of each membrane is closer to the anode than the cation layer. A direct current passed through the membrane in this configuration will cause water splitting with hydroxyl ions being produced on the anode side and a corresponding number of hydrogen ions being produced on the cathode side of the membrane.

Electrodialytic water-splitting in a two-compartment cell has been disclosed, for example, in U.S. Pat. No. 4,391,680 relating to the generation of strongly acidified sodium chloride and aqueous sodium hydroxide from aqueous sodium chloride. U.S. Pat. No. 4,608,141 discloses a multi-chamber two-compartment electrodialytic water splitter and a method for using the same for basification of aqueous soluble salts. U.S. Pat. No. 4,536,269 discloses a multi-chamber two-compartment electrodialytic water splitter and a method for using the same for acidification of aqueous soluble salts. These two patents review the use of two-compartment electrodialytic water splitters to treat salts.

Three-compartment electrodialytic water splitters are disclosed to be comprised of alternating bipolar, anion and cation exchange membranes thereby forming alternating acid, salt and base compartments. U.S. application Ser. No. 135,562 discloses three-compartment electrodialytic water splitters. U.S. Pat. No. 4,740,281 discloses the recovery of acids from materials comprising acid and salt using an electrodialysis apparatus to concentrate the acid followed by the use of an electrodialytic three-compartment water splitter to separate the acid from the salt.

The design of membranes for electrodialysis processes is complicated by the conflicting needs of obtaining low electrical resistance, high permselectivity and good mechanical properties. A high concentration of charged groups is necessary to achieve good permselectivity (permeation selectivity to either anions or cations) and considerable water swelling is needed to obtain a low resistance. In order to maintain good selectivity, swelling must be controlled. This can be accomplished by crosslinking the membrane resin or incorporating an inert matrix. Nearly all commercially available ion exchange membranes use a separate reinforcing fabric to support mechanically weak ion exchange material Reinforced membranes are manufactured by Asahi Glass Co. (Tokyo, Japan) and Tokuyama Soda Co. Ltd. (Tokuyama City, Japan) under the trade name Selemion ® and Neosepta ®. These are apparently prepared by the paste method as described by Y. Mizutani, R. Yamane, and H. Motomura, *Bull. Chem. Soc. Jpn.*, 38. 689 (1965). A fabric reinforcing material is an integral part of that process. Other widely available membranes, such as those of Ionics Inc. (Watertown, MA) and DuPont (Wilmington, DE), also employ a fabric reinforcement to achieve good mechanical properties. Nafion ® membranes made by DuPont are available with and without fabric reinforcement. The use of a fabric reinforcing material can improve the burst strength of a membrane and especially improve its tear resistance. However, the use of the reinforcing material can cause problems: 1) roughness makes sealing difficult; 2) part of the area is blocked off by the fibers and is not available for transport; 3) cracking can occur along fibers; 4) precipitates can form inside the membrane because of the heterogeneity caused by the fibers.

Therefore it is desirable to use membranes which do not rely on a fabric reinforcement to achieve good mechanical properties. Such membranes can be produced by radiation grafting onto a polymer film with the base film serving to improve the mechanical properties. Such membranes are produced commercially under the trade name Raipore ® by RAI Research Corporation, Hauppauge, NY. Other membranes can be prepared by solvent casting a polyelectrolyte and matrix polymer as described in U.S. Pat. No. 4,012,324 or by casting solutions of ion containing polymers with sufficient charge density to be water swollen but with enough water insoluble material to resist swelling. This type of the cation membrane is described in U.S. Pat. No. 4,738,784. Similar anion and bipolar membranes are described U.S. Pat. No. 4,116,889 and U.S. Pat. No. 4,766.161.

The design and operation of electrodialysis stacks is well known in the art and is described, for example, by H. Strathmann in the chapter "Electrodialysis" in *Synthetic Membranes: Science, Engineering and Applications*, P. M. Bungay, H. K. Lonsdale, M. N. dePinho Editors, D. Reidel Publishing Co., Dordrecht, Holland. Careful design of the electrodialysis stack hardware and operation to minimize pressure differentials and surges can help reduce the failure rate in membranes which are not mechanically robust. While membranes which are not fabric reinforced generally will not fail in use, should a membrane fail, it usually results in a large tear or hole because of the poor tear resistance of membranes which do not include a reinforcement. The resulting hole causes a leakage of solution between adjacent compartments and usually causes a loss of current efficiency, product concentration, and/or purity. The problem is especially acute when dealing with the concentrated solutions usually found in electrodialytic water splitting processes such as those described in U.S. Pat. No. 4,740,281, U.S. Pat. No. 4,504,373 and U.S. Pat. No. 4,557,815. The mixing of acid and base caused by failure of a bipolar membrane in an electrodialytic water splitting stack can greatly reduce process efficiency. If even one bipolar membrane in a stack of 100 rips, it is usually necessary to disassemble the stack and replace the broken membrane. Even though the cost of the membrane may not be significant, it is highly desirable to avoid shutting down the plant to perform this time consuming procedure. Reinforced bipolar membranes would be helpful, but the production of such membranes which retain the other desirable properties has proven difficult. In pressure driven membrane processes, it is well known to use a porous support to enhance the mechanical performance of otherwise weak membranes. Such structures have generally not been used in electrodialysis, probably because of problems with concentration polarization and delamination caused by differences in water transport between the layers.

It is desirable to minimize the effect of broken membranes on process efficiency and increase the interval between plant shutdowns caused by such leakage. It is also desirable to provide a system capable of improving the electrical performance of bipolar membranes.

SUMMARY OF THE INVENTION

The present invention relates to an improved apparatus of the type containing membranes which are selectively permeable to ion transport. The present invention includes an apparatus and cell for use in such apparatus, which comprises at least one guard membrane located adjacent to a first membrane to provide a leakage barrier should the first membrane leak. The guard membrane also provides protection against chemical attack and has been found to result in improved transport properties.

The apparatus comprises at least one unit cell comprising at least one first membrane having at least one ion selective layer selected from the group consisting of an anion selective layer and cation selective layer. There is at least one separate guard membrane, preferably a monopolar membrane, adjacent to at least one first membrane. By monopolar membrane it is meant that the membrane selectively permits permeation of one type of ion. It is either an anion selective membrane or a cation selective membrane. The guard membrane is in contact with the first membrane along the layer of the first membrane selective to the same type of ions as the monopolar guard membrane. The guard membrane can be an anion selective membrane or a cation membrane. The first membrane can be a bipolar membrane having a cation selective layer and an anion selective layer. Where the first membrane is a bipolar membrane, the guard membrane and adjacent layer of the bipolar membrane have the same polarity. Therefore, an anion selective layer of the bipolar membrane is adjacent to a monopolar anion selective guard membrane; alternatively a cation selective layer of the bipolar membrane is adjacent to a monopolar cation selective guard membrane.

In alternate embodiments, the first membrane can be a cation membrane or an anion membrane. Where the first membrane is a cation membrane the guard membrane is also a cation selective membrane. Where the first membrane is an anion membrane, then the guard membrane is an anion selective membrane.

It is preferred to use ion-exchange membranes as the guard membrane because they are generally chemically stable and have ion transport properties. Neutral membranes such as those based on cellulose acetate, polyvinyl alcohol or polyelectrolyte complexes can also be used adjacent to membranes or layers of cationic or anionic selectivity.

As used in the present invention the term "adjacent" with respect to a guard membrane means that the guard membrane is immediately next to the first membrane. The guard membrane is "guarding" the first membrane. Preferably, the guard membrane is in contact with the first membrane substantially over the active area through which ions pass to enable the maximum . efficiency and permeation of ions. There is no functional compartment between "adjacent" membranes.

In unit cells of the present invention useful for electrodialysis, the membranes are serially aligned to assure migration of anions towards the anode and cations towards the cathode. There are compartments between the serially aligned membranes into which the feed solutions are fed and from which product solutions are removed.

The present invention includes an electrodialysis apparatus comprising at least one unit cell. The present invention also includes a unit cell useful for electrodialysis apparatus. The preferred unit cell comprises a bipolar membrane having a cation selective layer and an anion selective layer. There is a least one guard membrane, preferably a monopolar membrane, adjacent to the bipolar membrane. The guard membrane is in contact with the bipolar membrane along the layer of the bipolar membrane selective to the same type of ions as the guard membrane.

In a specific and preferred electrodialysis apparatus the cell further comprises at least one ion selective membrane serially aligned with the neighboring bipolar membrane and guard membrane. There is a product compartment between the ion selective membrane and the neighboring membranes. There is an aqueous solution feed compartment next to the product compartment with the ion selective membrane therebetween. Where the ion selective membrane is an anion selective membrane it faces toward the cation layer of the bipolar membrane Analogously, where the ion selective membrane is a cation selective membrane it faces toward the anion layer of the bipolar membrane.

The present invention additionally comprises three compartment water splitters having a first cation selective membrane serially aligned with the anion selective layer of an neighboring first bipolar membrane. There is a base product compartment between the cation selective membrane and the bipolar membrane. There is a first anion selective membrane serially aligned with the bipolar membrane. There is an acid compartment located between the anion selective membrane and the last bipolar membrane. At least a portion of an electrolytic solution, typically an aqueous salt solution feed compartment, is serially aligned with each product compartment with the respective ion selective means therebetween. Guard membranes can be used adjacent any, or all of the first membranes in the cell, including the cation selective membrane, the anion selective membrane and the bipolar membrane.

The electrodialysis cell configuration comprising the guard membrane prevents the gross contamination of adjacent solutions should one of the first membranes performing the electrodialysis operation break. Preferably, the guard membrane is placed adjacent to one or both outer layers of a bipolar membrane in an electrodialytic water splitting apparatus.

Highly permeable ion exchange membranes adjacent to a bipolar membrane can function effectively to stop leaks without adverse effect on the overall operation of the stack. In order to serve this purpose, it is not necessary for the guard membrane to have outstanding mechanical properties itself, the principle being that if there is a small chance of either membrane breaking, then there is a much smaller chance that both will fail. Mechanically strong guard membranes are preferred.

The alternative of incorporating an additional layer into the normal membrane during manufacturer is less desirable. Such a layer cannot easily be applied to membranes purchased from another manufacturer. When the first membrane and supporting film are attached, there is a greater chance that the entire laminate will tear than when the two layers are not mechanically coupled. Except for the addition of the membrane to the cell, further modification of the stack hardware or operation is not usually required to install the guard membrane.

In addition to its use for leak prevention, the guard membrane can also serve the additional function of improving the seal between the operating membrane and gaskets (especially when rough or bumpy operating membranes are used). The guard membrane/first membrane combination will have different transport characteristics than the first membrane alone. This can be beneficial when electrodialyzing materials which normally diffuse rapidly through the first membrane; or when trying to achieve high product purity.

The salts and mixtures of salts processed in water splitters which incorporate guard membranes may be of any types known in the art. Guard membranes are particularly useful in systems where one or both products (i.e., acid or base) can cause chemical degradation of the component (i.e., membrane) protected by the guard membrane. The guard membrane can be chosen from a chemically more resistant material and act as a barrier to slow down attack on the protected membrane in addition to protecting against leakage in the normal way. For example, in a system which involves splitting of potassium nitrate or sodium chlorate. The nitric acid or chloric acid both can oxidize materials such as polystyrene which is typically used to make cation layers in bipolar membranes. A guard cation membrane comprising an oxidation resistant fluorinated polymeric material or sulfonated polysulfone can extend the useful life of the protected membrane.

The invention is useful in flat sheet cells normally used but could be of even greater advantage in spiral wound cells where a single membrane is larger and where replacement might be more difficult.

The present invention includes an improved method of electrodialytically treating an aqueous stream containing electrolytes, such as an aqueous salt solution in an electrodialysis apparatus.

BRIEF DESCRIPTION OF THE DRAWINGS

In the Figures the following transport convention was used. Major (desired) transport is indicated by a solid arrow.

DESCRIPTION OF THE PREFERRED EMBODIMENTS

The present invention will be understood by those skilled in the art by reference to the accompanying Figures.

Figure 1:
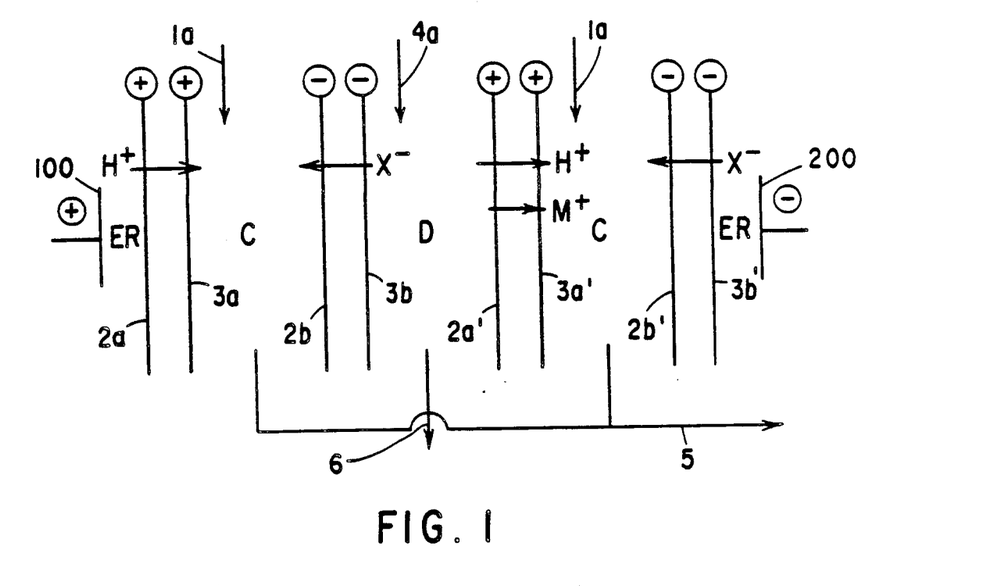
FIG. 1 is a schematic drawing of an electrodialysis apparatus of the present invention.
Figure 2:
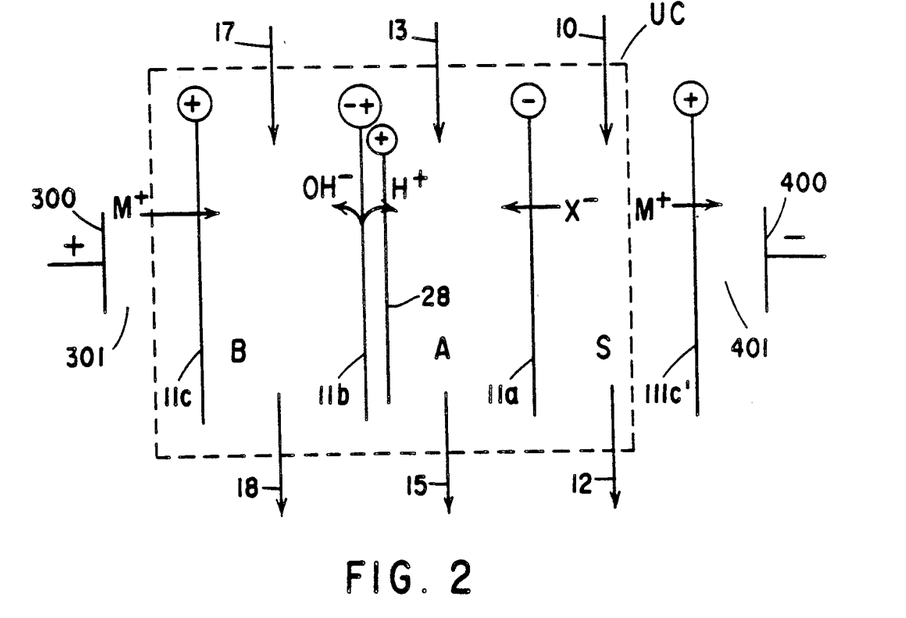
FIG. 2 is a schematic drawing of a three compartment electrodialytic water splitter of the present invention.

FIGS. 1 and 2 illustrate two electrodialysis apparatus in which the present invention can be used. FIG. 1 is an electrodialysis apparatus comprising monopolar anion and cation membranes. FIG. 2 illustrates a three compartment electrodialysis water splitter incorporating the features of the present invention.

The embodiments of FIGS. 1 and 2 are presented for illustrative purposes. The guard membranes are preferably used adjacent to bipolar membranes in electrodialytic water splitters illustrated by the three compartment water splitter shown in FIGS. 2 and 5 through 10.

The guard membrane can also be used in two compartment water splitters, such as reviewed in the Background of the Invention. A two compartment water splitter has a similar schematic drawing as FIG. 2 except that the unit cell comprises a bipolar membrane alternating with one type of monopolar membrane, i.e., a cation selective membrane or an anion selective membrane.

The present invention is directed to the use of guard membranes to prevent fluid leakage should the primary operative (first) membrane develop a leak or hole. The improvement of the present invention is useful in electrodialytic apparatus regardless of the specific configuration.

The electrodialysis apparatus includes at least one unit cell. In FIG. 1, unit cells are illustrated, each comprising a cation exchange membrane (+) and an anion exchange membrane (−) 2a, 2b, and 2a', 2b' respectively). The unit cells are arranged to define alternating dilute compartments (D) and concentration compartments (C).

The unit cells, which in practice may number up to two hundred or more, are arranged between an anode (+) 100 (e.g., a platinum anode) and a cathode (−) 200 (e.g., a platinum cathode).

The improvement of the present invention is the placement of a guard membrane adjacent to at least one first cation exchange membrane and/or at least one first anion exchange membrane. Guard membranes 3a and 3a' are cation exchange membranes adjacent to first cation membranes 2a and 2a' respectively; and guard membrane 3b and 3b' are anion exchange membranes adjacent to first anion membranes 2b and 2b' respectively.

The apparatus of FIG. 1 is useful, for example, for the recovery of acid from solutions comprising acid and salt. In operation, an aqueous electrolyte solution, preferably an acidic solution, is supplied to electrode rinse compartments (ER), and an aqueous solution, preferably an acidic solution, is supplied via streams 1a to the concentrating compartments (C). A solution comprising salt and acid is supplied to the dilute compartment (D) via 4a Direct current is then passed from the anode 100 to the cathode 200 causing hydrogen ions (H+) from the acid (both in the dilute compartment (D) and in the electrode rinse) and metal ions (M+) of the salt to migrate toward the cathode 200. Both the metal ions and hydrogen ions are capable of passing through the cation membrane 2a' and guard cation membrane 3a,' hydrogen ions are preferentially transported into the concentrating compartment (C) because of their greater mobility. Simultaneously, anions (X−) (both in the dilute compartment (D) and the electrode rinse compartment (ER) migrate toward the anode 100, passing through the anion permselective membranes 2b and guard anion membrane 3b. Accordingly, in the concentrating compartments (C), acid is formed (and a small amount of salt) and in the diluting compartment (D) an acid depleted salt solution remains. The product produced in the concentrating compartment (C) typically can contain up to at least about 80% of the free acid in the product solution, and may contain as much as about 95% or more of the free acid. The reaction product from the concentrating compartment (C) is then withdrawn via line 5 and can be recycled in whole or in part for further concentration or can be removed and reused or sold. The remaining depleted salt solution from the diluting compartment (D) is then removed via line 6 and can be subjected to further processing.

The guard membranes of the present invention can be used with water splitting membranes used in electrodialytic water splitting processes. Useful electrodialytic water splitters can include two compartment water splitters and three compartment water splitters, such as referred to in the Background of the Invention. The present invention will be illustrated using a three compartment water splitter schematically shown in FIG. 2. A three compartment electrodialytic water splitter comprises at least one unit cell (UC). Each unit cell comprises a cation, water-splitting, and anion membrane arranged in alternating fashion to define base (B), acid (A), and salt (S) compartments.

Employed in each unit cell are means for splitting water into hydrogen ions and hydroxyl ions (water-splitting membrane). Most preferably, the means for splitting water into hydrogen and hydroxyl ions is a bipolar membrane. Examples of bipolar membranes which are particularly useful include those described in U.S. Pat. No. 2,829,095 to Oda et al. (which has reference to water splitting generally), in U.S. Pat. No. 4,024,043 (which describes a single film bipolar membrane), and in U.S. Pat. No. 4,116,889 (which describes a cast bipolar membrane and is most preferred). However, any means capable of splitting water into hydrogen and hydroxyl ions may be used; for example, spaced apart anion and cation membranes having water disposed therebetween. The means for splitting water in FIG. 2 is a bipolar membrane 11b.

The cation exchange membranes employed in the electrodialysis apparatus of the present invention may be moderately acidic (e.g., phosphonic group-containing) or strongly acidic (e.g., sulfonic group-containing) cation permselective membranes or acidic fluorocarbon cation permselective membranes. Particularly useful cation membranes are DuPont's Nafion ® acidic fluorocarbon membranes, especially Nafion ® 110, 901, and 324 cation membranes. More preferably, the cation membranes are of the composition and construction disclosed in U.S. Pat. No. 4,738,764.

Anion membranes useful in the electrodialysis apparatus of the present invention are strongly, mildly or weakly basic anion permselective membranes. Useful membranes are, for example, Toyo Soda's DF43 or Asahi Glass Company's anion permselective membranes sold under the trade name Selemion ® AMV, ASV or AAV. Most preferably, the anion permselective membranes used in the present invention are the Asahi Glass AAV membranes.

FIG. 2 schematically illustrates a design of a three compartment electrodialytic water splitter employed to recover and regenerate acid and base from salt solutions. As illustrated, the three compartment electrodialytic water splitter comprises, in series an anode 300 (e.g., a platinum anode), an anolyte compartment 301, unit cells (UC) of alternating base (B), acid (A), and Salt (S) compartments, a catholyte compartment 401, and a cathode 400 (e.g., a platinum cathode). The base, acid and salt compartments of the three compartment water splitter illustrated in FIG. 2 are defined by a plurality of serially arranged membranes as follows: a cation permselective membrane 11c, a bipolar membrane 11b, anion permselective membrane 11a, and a cation permselective membrane 11c. Although FIG. 2 shows four serially arranged membranes, the three compartment electrodialytic water splitters are defined by a plurality of unit cells, each unit cell (UC) comprising an anion membrane, a cation membrane and a bipolar membrane (or equivalent structures capable of splitting water into hydrogen and hydroxyl ions). The improvement of the present invention is at least one and preferably each cell 30 having a monopolar cation guard membrane 18 adjacent to the cation layer of bipolar membrane 11b.

In accordance with a preferred embodiment of the present invention, the anolyte and catholyte compartments contain a salt, base or acid solution, the acid (A) and base (B) compartments initially contain a liquid comprising water, added via 13 and 17, respectively, salt S compartment initially contains a salt solution, added via line 10. Splitting of the salt into acid and base commences by applying a direct current through the water splitter 10 from the anode to the cathode.

In the acid compartment (A) which is supplied with a liquid comprising water and, preferably, an electrolyte, hydrogen ions (H+) are added via the function of the bipolar membrane 11b. The hydrogen ions pass through guard membrane 18 to the acid compartment (A). Simultaneously, anions (designated X$^-$ in the drawings) of the salt(s) are transported across the anion membrane 11a into the acid compartment (A). The reaction of the hydrogen ions with the anions yields an acid product HX. The designation X$^-$ (i.e., MX or HX) refers not only to monovalent anions but also to divalent anions, such as sulfates, and trivalent anions, such as phosphates, and mixtures thereof.

Cations in the salt compartment (S) simultaneously pass through the cation membrane 11c' to the catholyte and from the anolyte to the base B compartment. In the base (B) compartment, cations (M+) migrate through the cation membrane 11a react with the hydroxyl ions (OH$^-$) generated by the bipolar membrane 11b' to produce a basified solution.

Metal ions (M+) are added to the catholyte compartment from the salt S compartment. Accordingly, the anolyte and catholyte solutions are typically continuously recirculated from the anolyte compartment to the catholyte compartment and back (or the reverse) to maintain a substantially constant concentration of electrolyte in each compartment.

The acid product from compartment (A) is removed via 15, the base product from base compartment (B) is removed via 18, and the depleted salt solution from compartment (S) is removed via 12.

The electrodialytic water splitter can be operated in a batch mode, a continuous mode, or variations thereof. Product solutions or portions thereof (e.g., when using a feed and bleed apportionment operation) may be recycled for further concentration. Mechanisms for serial feed through similar compartments (not shown) may be employed. These and other modifications, changes and alterations to the design of the water splitter will not affect the scope of the invention and will be obvious to those of ordinary skill.

The electrodialytic water splitter is ordinarily supplied with a direct current ranging from about 30 amps/ft$^2$ (<<300 A/m$^2$) to about 200 amps/ft$^2$ (<<2000 A/m$^2$), preferably from about 80 A/ft$^2$ (<<800 A/m$^2$) to about 120 A/ft$^2$) (<<1200 A/m$^2$) amps. The water splitter normally operates at a temperature of between about 10° C. and about 80° C., with a temperature range of between about 30° C. and 55° C. being preferred.

A preferred construction illustrating a unit cell, and a plurality of unit cells, illustrating a preferred embodiment of the present invention containing the guard membrane with a three compartment water splitter will be understood by reference to FIGS. 3 through 7.

Figure 3:
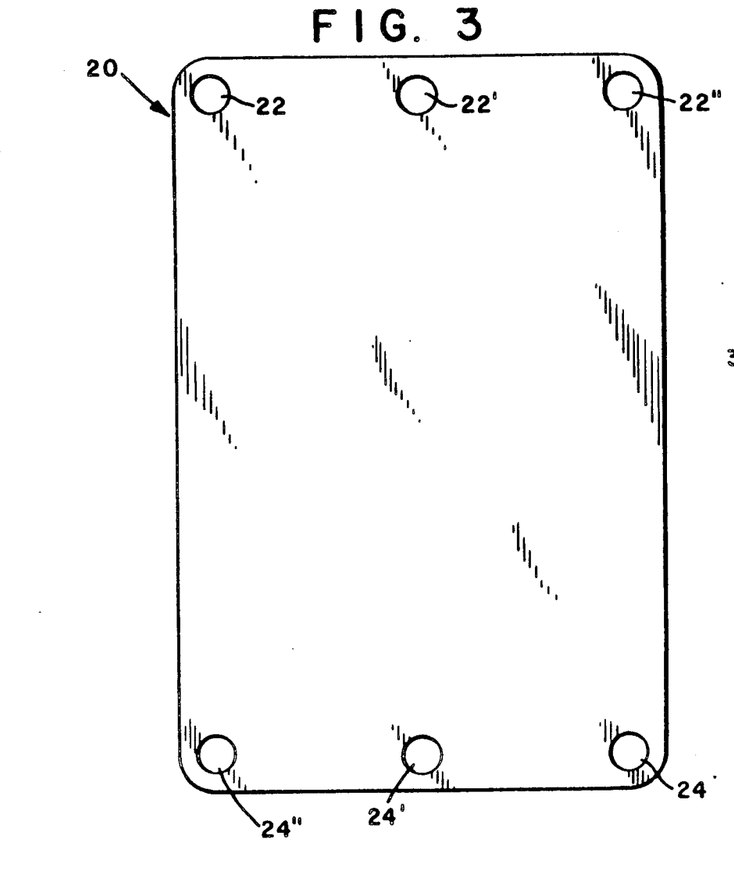
FIG. 3 is a schematic drawing of a membrane useful in the present invention.

FIG. 3 is a front view of a typical rectangular membrane 20 useful in a membrane stack. Anion selective membranes, cation selective membranes and bipolar membranes will all have the same front view. They are a solid sheet of material selective to different ions. Depending on the type of electrodialytic cell used there will be an appropriate number of inlet openings 22, 22' and 22" in a three compartment electrodialytic water splitter. A two compartment electrodialytic water splitter will make use of two manifold openings. There are correspondingly outlet manifold openings 24, 24' and 24". In a preferred membrane stack the outlet manifold openings are at the top and the inlet manifold openings are at the bottom.

Figure 4:
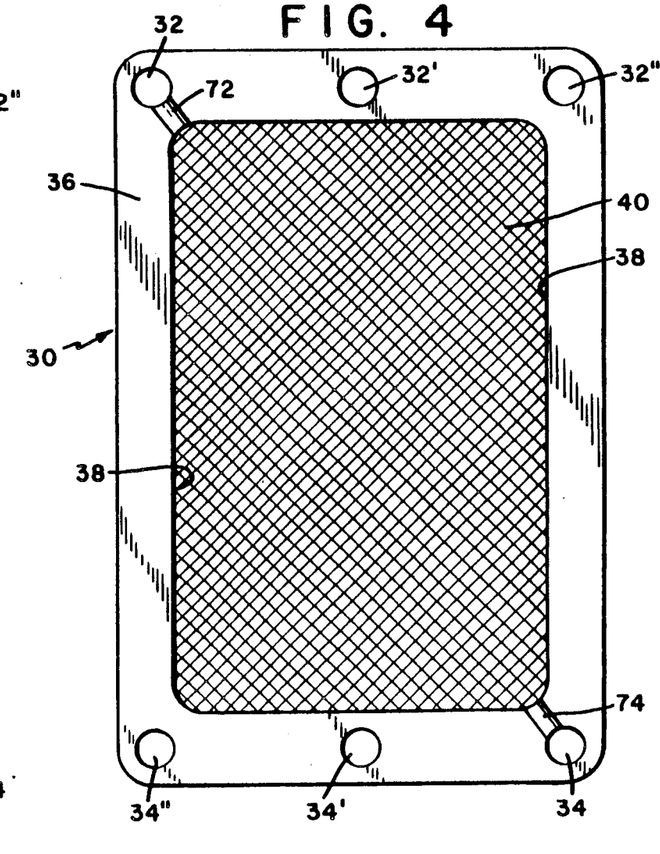
FIG. 4 is a schematic drawing of a gasket useful in the present invention.

FIG. 4 illustrates a gasket 30 useful with membranes of the shape shown in FIG. 3. The gasket has a solid perimeter 36. The perimeter contains inlet manifold openings 32, 32' and 32" in corresponding positions to manifold opening inlets 22, 22' and 22" of the membranes. The gasket 30 has corresponding outlet manifold openings 34, 34' and 34" corresponding to the outlet manifold openings 24, 24', and 24" of the membrane. The gasket is open in the center with the center opening defined by the inner periphery of the solid perimeter. The center opening will be referred to as the compartment. In essence, the center opening of the perimeter defines the edges of the various compartments reviewed above in the schematic drawings shown in FIGS. 1 and 2. Preferably, there are support means across the compartments, such as mesh screen 40. The thickness of at least a portion of the mesh screen is less than the thickness of the outside periphery 36 to enable fluid to flow through compartment 38 from the inlet manifold openings 32 to the outlet manifold openings 34. There is an inlet port 72 from the inlet manifold opening 32 to compartment 38, and an outlet port 74 from compartment 38 to outlet manifold opening 34. The compartment 38 in FIG. 4 is shown to be rectangular. The compartment can be any suitable shape, such as circular, or triangular. When a plurality of gaskets and membranes are assembled into a stack, the openings in the gaskets and membranes form internal manifolds. Solutions can be fed to these manifolds via the end plates of the stack or special plates inserted into the stacks.

Figure 5:
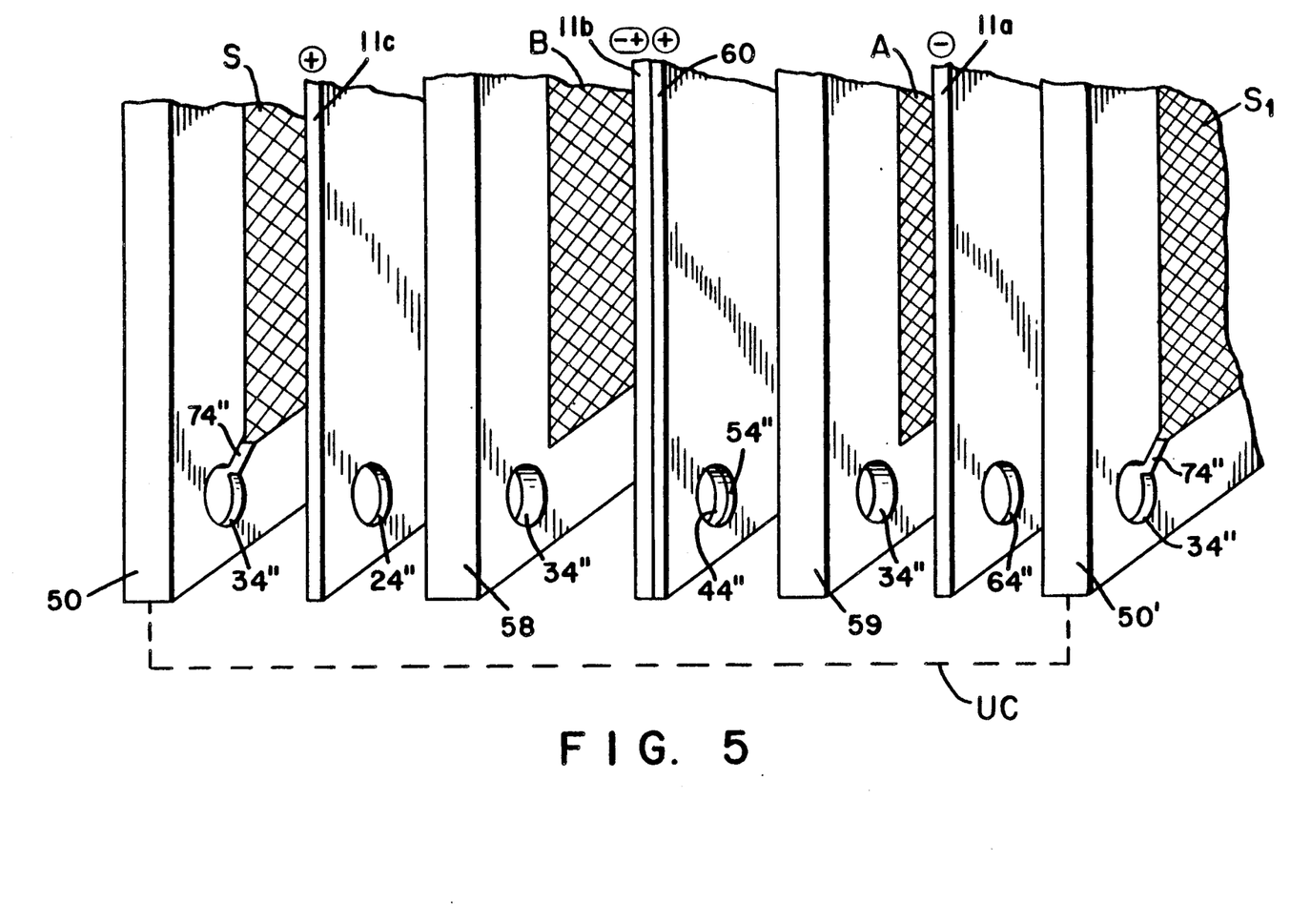
FIG. 5 is a partial view in perspective of the unit cell of the three compartment water splitter shown in FIG. 2.

FIG. 5 is a partial view in perspective of a unit cell UC of the three compartment water splitter shown in FIG. 2. The various elements of the cell are exploded apart from each other. In an electrodialytic apparatus a plurality of cells are pressed together into one unit called the stack. The unit cell illustrated in FIG. 5 comprises a gasket 50 having salt compartment (S). There is a manifold opening outlet 34" in communication with salt compartment (S) through port 74". The elements of the unit cell are serially aligned with cation membrane 11c bordering gaskets (i.e., gasket 50) containing the salt compartment (S). Cation membrane 11c is shown having outlet manifold opening hole 24" The manifold opening hole 34" in gasket 50 and 24" of cation membrane 11c are located so that on assembly of the cell they are aligned. Adjacent to cation membrane 11c on the side opposite gasket 50 is gasket 52 which defines base compartment (B). Gasket 52 contains manifold opening hole 34" which is aligned with manifold openings 34" of gasket 50 and manifold opening 24" of cation membrane 11c. Although not shown, there is a port from manifold opening 34' to the base compartment (B). Adjacent to gasket 58 on the side opposite cation membrane 11c is bipolar membrane 11b. The bipolar membrane 11b has an anion layer (−) and a cation layer (+). The anion layer (−) faces toward the cation membrane 11c and in the electrodialytic unit toward anode 300. Adjacent to and substantially in contact with the cation layer (+) of bipolar membrane 11b is guard membrane 60. Guard membrane 60 is adjacent to the cation layer of the bipolar membrane and is a cation membrane. Bipolar membrane 11b and guard membrane 60 are shown to have manifold opening 44" and 54" respectively. Not shown are manifold openings 44, 44'; and 42, 42' and 42", 54, 54', 52, 52' and 52" in corresponding relation to manifold openings 34, 34' and 32, 32' and 32".

Adjacent to guard membrane 60 is gasket 59, also having outlet manifold opening 34. The solid perimeter of gasket 59 defines an open acid compartment (A). There is a port 72 from inlet manifold opening 32 and a port 74 from outlet manifold opening 34 to acid compartment (A). Adjacent to gasket 59 on the side of the gasket opposite guard membrane 60 is anion membrane 11a. Anion membrane 11a similarly has inlet and outlet manifold openings with outlet manifold opening 64" shown. Adjacent to the anion membrane 11c on the side opposite the side of anion membrane from gasket 59 is a repeat of gasket 50 (i.e. 50') having salt compartment (S). While the unit cell (UC) can be defined arbitrarily along the repeating line of gaskets (compartments) or membranes, for the purposes of the present invention the unit cell starts from the middle of salt compartment (S) in gasket 50 and ends at the next gasket 50' in the middle of the salt compartment (S1). Each of the membranes has inlet manifold openings (i.e., 22, 22', 22") and outlet manifold openings (i.e., 24, 24' and 24"). Each of the gaskets has inlet manifold openings (i.e., 32, 32', 32"), and outlet manifold openings (i.e., 34, 34' and 34"). For example, inlet manifold opening 32 and outlet manifold opening 34 communicate to the acid compartment (A). In this way an aqueous fluid is fed into the acid compartment (A) from inlet manifold opening 32 and the treated material resulting in a product is removed from outlet manifold opening 34. Similarly, the base compartment (B) is in communication with inlet manifold opening 32' and outlet manifold opening 34', and the salt compartment (S) in communication with inlet manifold opening 32" and outlet manifold opening 34".

An aqueous solution is fed to the base compartment (B) via inlet manifold opening 32' which communicates by a suitable port 72' to base compartment (B). The base compartment (B) product is removed through a port 74' communicating with outlet manifold opening 34'. Finally, each salt compartment (S) is in communication with inlet manifold opening 32" via port 72" and outlet manifold opening 34" via port 74". A solution of salt to be split is fed into the salt compartment (S) via inlet manifold opening 32" which communicates via a port 72" to the salt compartment (S) and the depleted salt solution is removed through port 74" communicating with outlet manifold opening 34". In FIG. 5, the outlet port 74" is illustrated. FIG. 4 shows inlet port 72 communicating from the inlet manifold opening to the acid compartment (A) and outlet port 74 from the acid compartment (A) to the outlet manifold opening 34. The membranes and gaskets are stacked together in a sealed fashion wherein the inlet manifold openings and outlet manifold openings form fluid passageways. The streams being fed into the membrane stack and removed from the membrane stack can thereby be removed via the holes in the membranes and the gaskets without the necessity of cumbersome piping. The membranes and gaskets can be pressed together by suitable mechanical means. Typically, the membranes and gaskets are assembled in a stack and held together in a frame under sufficient pressure to form sealed compartments.

An electrodialysis apparatus can comprise multiple banks of stacks comprising a plurality of cells. Each bank can be fitted with separate anodes and cathodes or alternatively, one anode and one cathode can be used across the whole stack comprising a plurality of banks containing a plurality of cells.

The embodiment in FIG. 5 is a preferred embodiment illustrating the use of guard membrane 60. The guard membrane 60 has as its primary purpose to provide a backup should the bipolar membrane develop a leak. Additionally, the use of the separate guard membrane having ion selective properties can further help to control the operation of the electrodialytic apparatus. By carefully selecting the guard membrane, the efficiency for generation and purity of the product acid and base can be controlled and enhanced.

Figure 6:
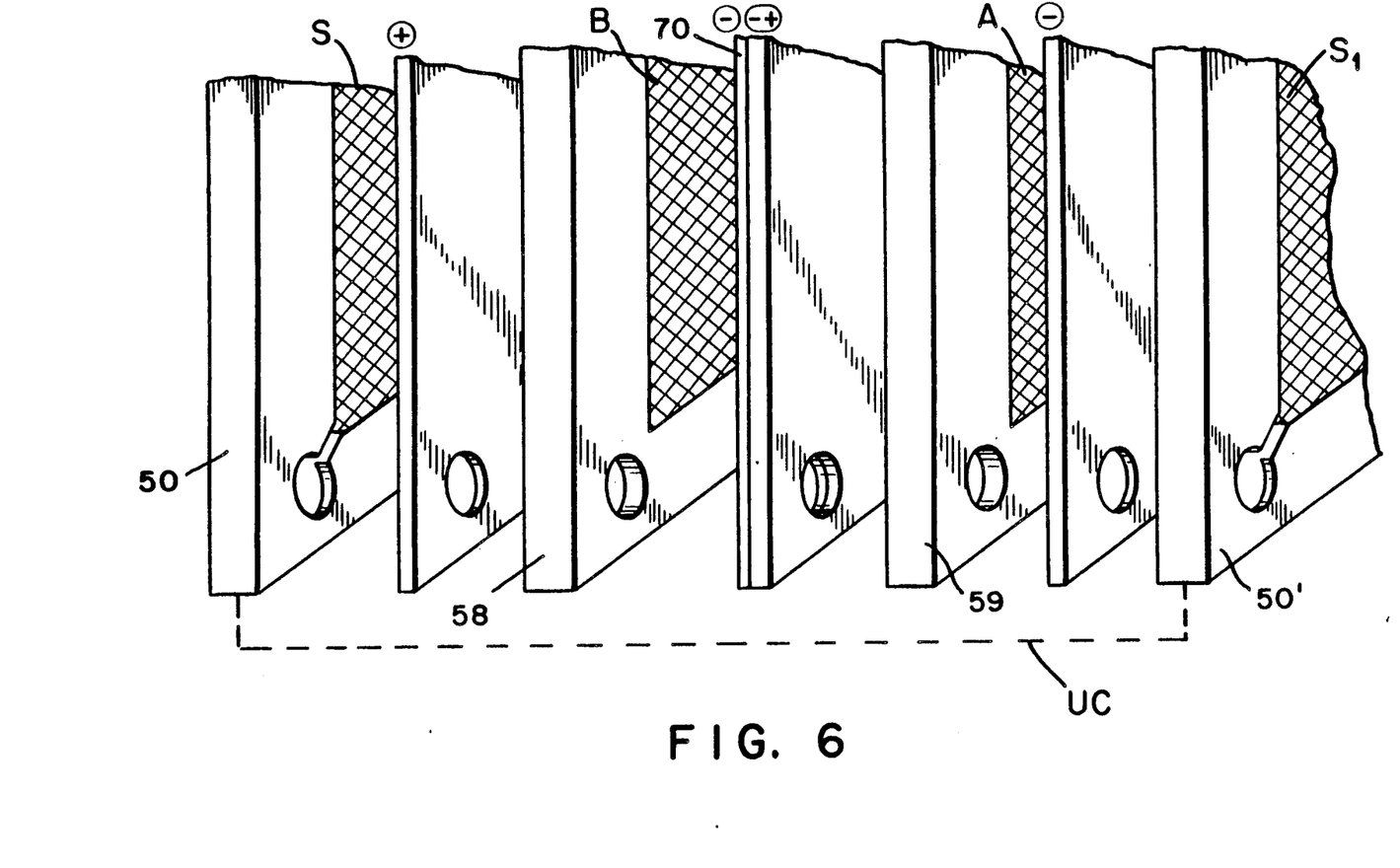
FIG. 6 is a partial view in perspective of an alternate embodiment of a unit cell for a three compartment water splitter.

FIG. 6 is an alternate embodiment of the present invention. FIG. 6 is identical to FIG. 5 with common elements having the same reference characters as described above with reference to FIG. 5. FIG. 6 contains an anion guard membrane 70. The anion guard membrane can be used in situations where the character of the system is such that a leak is likely to develop from the anion side of the bipolar membrane. The selection of the anion guard membrane can be used further to control the process while providing a guard membrane.

Figure 7:
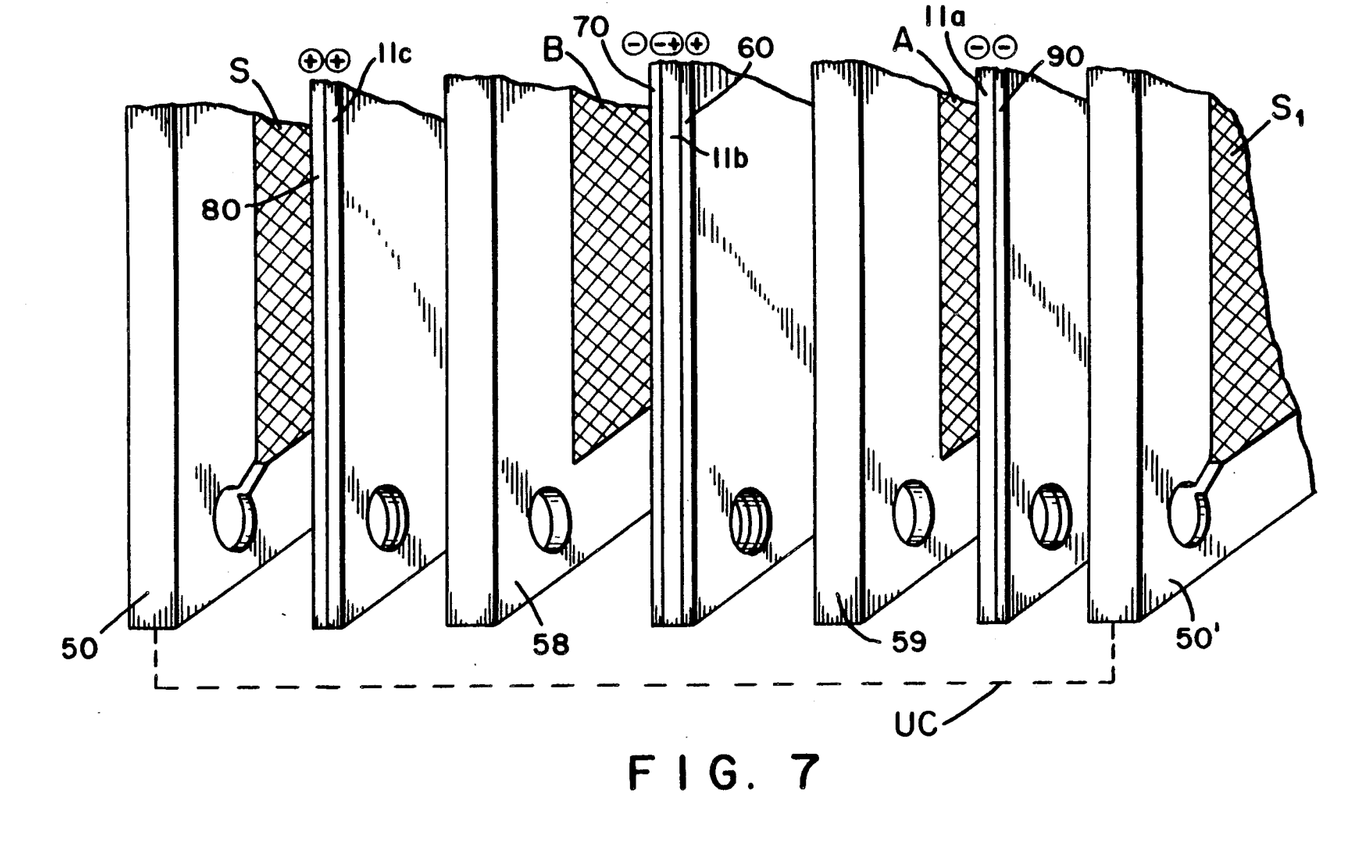
FIG. 7 is a partial view in perspective of an alternate embodiment of a unit cell for a three compartment water splitter having guard membranes on all of the membranes of the unit cell.

FIG. 7 is yet another alternate embodiment. Reference is made to FIG. 5 for a description of common elements. In this embodiment there is a cation guard membrane 60 adjacent to cation layer of bipolar membrane 11b and an anion guard membrane 70 adjacent to anion layer of bipolar membrane 11b. Additionally, guard membranes have been included with monopolar cation membrane 11c shown as guard membrane 80 and anion guard membrane 90 adjacent to anion membrane 11c. In the embodiment illustrated in FIG. 7, the guard membranes are shown to be on the side of the monopolar membranes opposite the bipolar membrane. This may be desirable from a processing point of view, however, guard membranes can be on the sides of the monopolar membrane closest to the bipolar membrane 11b or even on both sides of each monopolar membrane.

Consideration of current efficiency, expense, size and the like, should be made in determining how many and what types of guard membranes to use. As indicated above, it is preferable that the guard membranes have higher permeability to water than the membrane layers to which they are adjacent. The primary operating function should be the operative membranes with the guard membranes being used for support and improvements in efficiency rather than total functionality with regard to the water splitting apparatus' goal.

When assembling the stack, a few air bubbles may become trapped between the functional membrane and the guard membrane. These can be minimized by liberal application of water or salt solution to the membrane surfaces during assembly. Some bubbles are inevitably trapped, but they disappear during the normal operation of the stack. Start-up at lower than normal current density may be necessary if the stack potential drop is too high at first.

The following examples illustrate the practice of the present invention. The examples should not be construed as limiting the invention to anything less than that which is disclosed or which would have been obvious to one of ordinary skill in the art therefrom. Percents and parts are by weight unless otherwise indicated.

EXAMPLES

Figure 8:
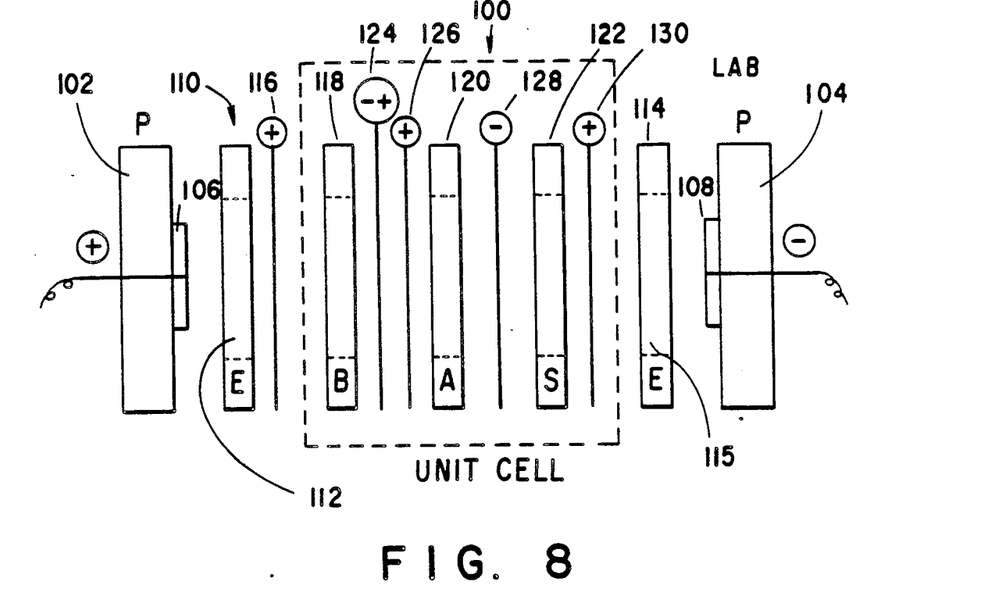
FIG. 8 is a schematic drawing of an electrodialytic stack used in the Examples.

The examples were conducted using the electrodialytic stack shown in FIG. 8. The assembly comprised two end plates 102 and 104. A plurality of cells were located between a nickel anode 106 and a stainless steel cathode 108. Each unit cell was a three compartment water splitting electrodialytic unit cell (UC). The repeat unit of the unit cell is shown to encompass a base compartment (B), an acid compartment (A) and a salt compartment (S). As indicated above, each of these compartments is contained within the opening in a gasket. There is a first gasket 110 located adjacent to anode 106. This gasket contained the anolyte compartment 112. There was a second gasket 114 adjacent to the cathode 108. This gasket contained the catholyte compartment 114. Between the anolyte compartment containing gasket 110, the catholyte compartment containing gasket 114 was the operative electrodialytic stack of alternating ion selective membrane means and gaskets having the various acid base and salt compartments. There was a cation membrane 116 adjacent to gasket 110. This is followed by a plurality of repeating unit cells (UC). Each unit cell (UC) contains a base compartment (B) in gasket 118, an acid compartment (A) in gasket 120 and a salt compartment (S) in gasket 122. Between gasket 118 (base compartment) and gasket 120 (acid compartment) there was a bipolar membrane 124 with the anion layer facing toward anode 106 and cation selective layer facing toward cathode 108. In the examples of the present invention, a guard membrane 126 was adjacent to the cation layer of bipolar membrane 124 between the bipolar membrane 124 and gasket 120. Between gasket 120 and gasket 122 was anion membrane 128. The anion membrane was between the acid compartment (A) and the salt compartment (S). Adjacent to the salt compartment (S) on the side opposite from anion membrane 128 was cation selective membrane 130. The unit cell (UC) is shown to extend from the base compartment (B) to cation membrane 130 and contains a base compartment (B), an acid compartment (A) and a salt compartment (S). There is a guard membrane between the base compartment (B) and the acid compartment (A) adjacent to the cation layer of the bipolar membrane.

The exposed membrane area for each membrane was 23 cm$^2$. The gaskets were made of polyethylene and consisted of a cutout central portion filled with a screen which formed the solution compartment and an outside area used for sealing and forming the internal manifolds for acid, base and salt solutions. Each gasket also had a pair of manifold openings to carry fluid to and from either the acid, base or salt input and output manifolds to and from the central active area according to the function of the gasket. In electrode rinse gasket 110 and 114 and a DuPont Nafion® 324 membrane (116 and 130) were placed adjacent to each end plate. Three unit cells (UC) were incorporated into the stack by sequentially adding from the anode end a base gasket, a bipolar membrane, an acid gasket, an anion exchange membrane, a salt gasket, and a cation exchange membrane. Next to the final cation exchange membrane was placed an additional base gasket so the stack consisted of four base compartments but only three acid and salt compartments. The cation membranes in the unit cell (UC) were produced by the method of U.S. Pat. No. 4,738,764, the bipolar membranes by the method of U.S. Pat. No. 4,766,161, and the anion membrane according to the method of preparing the anion layer of the membranes in U.S. Pat. No. 4,766,161.

Figure 9:
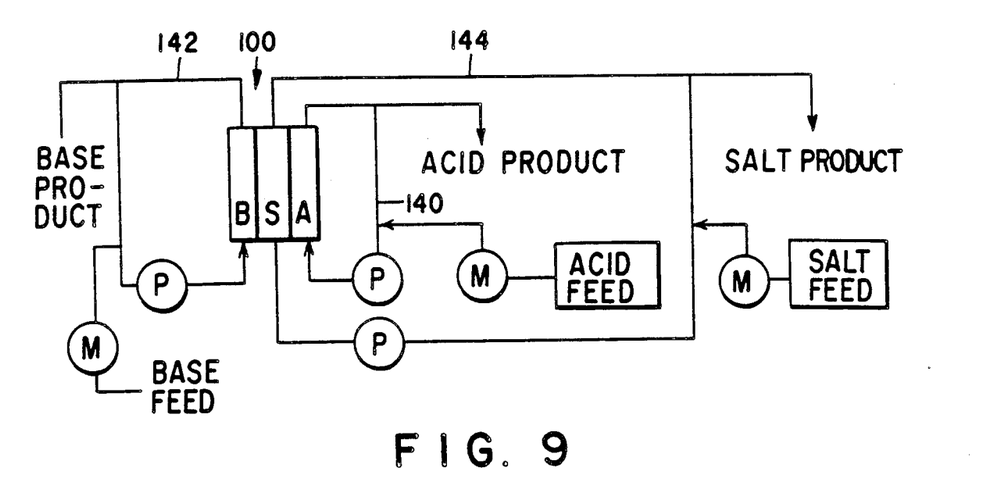
FIG. 9 is a schematic flowsheet of the system used in the Examples.

The stack was placed in a water splitting system as shown in FIG. 9. Each loop (acid 140, base 142 and salt 144) consisted of a recirculation pump (P) to pump solution through the stack at about 500 mL/min and a metering pump (M) to pump solution from a feed reservoir to the recirculation loop. The feed caused an overflow from each of the loops. From the flux and composition of the overflow, the efficiency for acid and base production could be determined.

COMPARATIVE 1

The unit cell UC of FIG. 8 was assembled without the guard membrane 126. The loops were each charged with 100 mL of dilute KF. Water was metered to the acid and base loops and a solution of 0.6 M $KNO_3$ +1.06 M KF was metered to the salt. After running for 8 hours with a current of 2.0 A the system was near steady state. The potential drop across the stack was 11.0 volts. The acid overflow was 1.194 g/min of 2.78N acid. The base overflow rate was 2.505 g/min and was 1.605N. The salt overflow rate was 3.304 g/min and was 0.131N acid and had a conductivity of 0.061 S/cm. Based on the stream analyses, the efficiency for acid production was 0.63 and the efficiency for base production was 0.75. Most of the difference is found in the acid being lost in the salt overflow. The operation was typical of stacks operated under these conditions with the membranes employed.

EXAMPLE 1

The same stack as described in Comparative 1 was assembled but this time an additional guard membrane 126 was placed in each unit cell (UC) immediately adjacent to the cation side of the bipolar membrane. These guard cation membranes 126 in the drawing were 2 mil thick Raipore® (RAI Research Corporation) R-1010 strong acid cation membranes having a resistance of about 0.4 ohm-cm$^2$ The stack was operated in a manner similar to Comparative 1. The salt feed was 1.7 M KF +0.35 M $KNO_3$. After 24 hours of operation the potential drop across the stack was 11.0 volts, acid overflow as 1.39 g/min of 2.904N material. The base flux was 2.68 g/min of normality 1.567. The salt overflow was 1.66 g/min, was slightly basic, and had conductivity of 0.043 S/cm. The acid and base efficiencies were calculated to be 0.78. The improved efficiency compared to Comparative 1 is probably due mostly to the additional fluoride in the salt feed. The operation of the stack was not discernibly different from the operation of stacks without the guard membranes.

EXAMPLE 2

The stack from Example 1 was disassembled and a 0.5 cm diameter hole was punched in one of the bipolar membranes. The stack was then reassembled with the guard membranes in place. A test showed a leak rate of <1 mL of acid to base in 1 hour 20 minutes with a flow to the acid of 460 mL/minute and no flow to the base. The stack was placed back in the water splitting system and operated as in Example 1. After 21 hours, the potential drop across the stack was 11.9 volts, the acid overflow was 1.504 g/min of 2.44N solution, the base overflow was 2.68 g/min of 1.46N solution and the salt overflow was 1.58 g/min of slightly basic solution of conductivity 0.039S/cm. The current efficiency based on the acid and base overflow rates was 0.73.

COMPARATIVE 2

The stack was taken apart and reassembled without the R-1010 guard membranes. A leak test gave 140 mL/min flow from acid to base. Operation of the stack with such a large leak is clearly not possible. The guard membranes therefore were effective in allowing operation with minimal change in performance when damage to the bipolar membrane made operation without them impossible.

EXAMPLE 3

Figure 10:
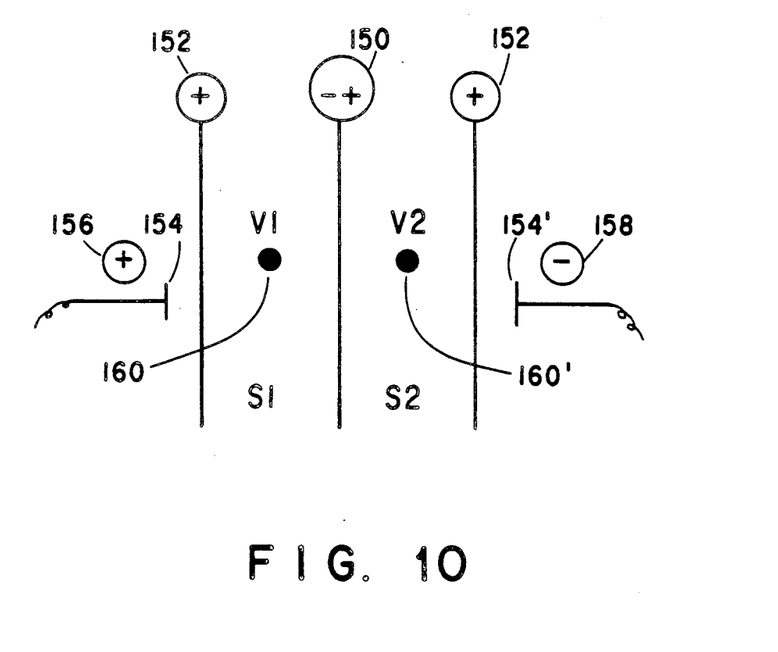
FIG. 10 is a schematic drawing of the apparatus used to test the potential drop across membranes in Example 3.

The potential drop across various combinations of bipolar membranes and guard membranes (150) was measured using the arrangement shown schematically in FIG. 10. The membranes were spaced apart 1.7 cm by cylindrical sections of 3.74 cm diameter plastic pipe. Each section was equipped with inlet and outlet tubes for addition and removal of solution. The sections and membranes were held in place by end plates 154, 154' to which were attached a platinum anode (156) and a platinum cathode (158). The membranes next to the electrodes were DuPont Nafion® 110. 1 mm diameter Ag/AgCl electrodes (160, 160') were placed in the center of the two compartments on either side of the central membrane to be used as voltage probes. 0.5 M sodium sulfate was circulated to the compartments next to the electrodes from a common reservoir. 0.5 M sodium sulfate solution controlled at a temperature of 30+/−0.2° C. was circulated to the compartments S1 and S2. A high impedance multimeter was used to measure the potential between the voltage probes V1 and V2 as a direct current was passed through the cell. The central membrane was then removed and the procedure was repeated so that the contribution of the solution to the total observed potential drop could be determined. The net potential drop across a bipolar membrane of the same type as used in Example 1 with and without guard membranes is given in Table 1.

The guard membranes were as follows:

SPSU was prepared by sulfonation of polysulfone by method described in U.S. Pat. No. 4,738,764. The ion exchange capacity of the material was 1.48 meq/g. The membrane thickness was 2 mils and the membrane resistance was 1.0 ohm-cm$^2$ in 0.5 M sodium sulfate at 30° C. The bipolar and guard assembly were measured with the SPSU membrane on the cathode side of the bipolar membrane. SPS was prepared by sulfonation of polystyrene and Kraton-G according to the procedure in U.S. Pat. No. 4,738,764. The membrane was 4.5 mils thick and had a resistance in 0.5 M sodium sulfate at 30° C. of 2.8 ohm-cm$^2$ the bipolar and guard assembly was measured with the SPS membrane placed on the cathode side of the bipolar membrane.

R-4035 is a commercially available anion exchange membrane from RAI Research Corporation. The membrane has a thickness of 2 mils and a resistance in 0.5 M sodium sulfate at 30° C. of 1–2 ohm-cm$^2$. The bipolar membrane and guard assembly was measured with the R-4035 on the anode side of the bipolar membrane.

TABLE 1

| Current (Amperes) | Potential Drop (volts) | | | |
|---|---|---|---|---|
| | Bipolar Alone | Bipolar + SPSU | Bipolar + SPS | Bipolar + R-4035 |
| 0.05 | 0.73 | 0.73 | 0.75 | 0.77 |
| 0.1 | 0.75 | 0.75 | 0.77 | 0.79 |
| 0.2 | 0.81 | 0.81 | 0.82 | 0.84 |
| 0.4 | 0.88 | 0.88 | 0.90 | 0.90 |
| 0.6 | 0.92 | 0.94 | 0.96 | 0.95 |
| 0.8 | 0.96 | 0.97 | 1.01 | 0.98 |
| 1.0 | 0.99 | 1.00 | 1.05 | 1.02 |
| 1.2 | 1.02 | 1.03 | 1.08 | 1.06 |

A current of 1.2 A is equivalent to about 100 A/ft$^2$, a current density frequently suggested for commercial operations. The potential drop across the bipolar membrane, a measure of energy requirements for acid base generation was not substantially changed by presence of the guard membrane.

EXAMPLE 4

Apparatus similar to that of Example 3 was used to measure the current efficiency of the bipolar membrane used in Example 3 with and without a guard membrane. The apparatus was modified so that separate solution could be pumped to the compartments S1 and S2. The voltage probes were removed. The solutions circulated to S1 and S2 were 2 M NaCl. The efficiency for hydrogen and hydroxyl ion generation was measured by periodically adding a known amount of standard 1N HCl to the reservoir supplying compartment S1 and measuring the time for the pH to return to neutral. After measuring the efficiency as a function of current density with the bipolar membrane alone, the R-4035 membrane of Example 3 was placed on the anode side of the bipolar and the efficiency was determined again. The results are shown in Table 2.

TABLE 2

| | CURRENT EFFICIENCY | |
|---|---|---|
| Current Amperes | Bipolar Alone | Bipolar + R-4035 |
| 0.60 | 0.899 | 0.940 |
| 0.90 | 0.912 | nd |
| 1.20 | 0.919 | 0.959 |

The results clearly show that in addition to providing protection against mechanical leakage across the bipolar membrane, the guard membrane is able to improve the water splitting efficiency of the membrane. The performance improvement would be most useful when higher purity acid or base was desirable.

While exemplary embodiments of the invention have been described, the true scope of the invention is to be determined from the following claims.

What is claimed is:

1. A unit cell comprising:
   at least one first membrane having at least one ion selective layer selected from the group consisting of anion selective layers and cation selective layers, and
   at least one separate monopolar guard membrane adjacent to the at least one first membrane, the guard membrane being in contact with the first membrane along a layer of the first membrane selective to the same type of ions as the guard membrane.

2. An electrodialysis apparatus comprising at least one unit cell comprising:
   at least one first membrane having at least one ion selective layer selected from the group consisting of anion selective layers and cation selective layers, and at least one separate monopolar guard membrane adjacent to the at least one first membrane, the guard membrane being in contact with the first membrane along a layer of the first membrane selective to the same type of ions as the guard membrane.

3. The apparatus as recited in claim 2 wherein the guard membrane is an anion selective membrane.

4. The apparatus as recited in claim 2 wherein the guard membrane is an cation selective membrane.

5. The apparatus as recited in claim 2 wherein the first membrane is a bipolar membrane having a cation selective layer and an anion selective layer, the bipolar membrane being adjacent to at least one separate monopolar guard membrane.

6. The apparatus as recited in claim 5 wherein the guard membrane is selected from the group consisting of anion and cation selective membrane.

7. The apparatus as recited in claim 2 wherein first membrane is a cation selective membrane and the guard membrane is a cation selective membrane.

8. The apparatus as recited in claim 2 wherein first membrane is an anion selective membrane and the guard membrane is an anion selective membrane.

9. An electrodialysis apparatus comprising at least one unit cell comprising:
a bipolar membrane having a cation selective layer and an anion selective layer, and
at least one separate monopolar guard membrane adjacent to the bipolar membrane, the guard membrane being in contact with the bipolar membrane along a layer of the bipolar membrane selective to the same type of ions as the guard membrane.

10. The apparatus as recited in claim 9 further comprising:
at least one ion selective membrane serially aligned with the adjacent bipolar membrane and guard membrane, there being a product compartment between the ion selective membrane and the adjacent membranes; and
an aqueous salt solution feed compartment adjacent the product compartment with the ion selective membrane therebetween.

11. The apparatus as recited in claim 10 wherein the ion selective membrane is an anion selective membrane facing toward the cation layer of the bipolar membrane.

12. The apparatus as recited in claim 10 wherein the ion selective membrane is an cation selective membrane facing toward the anion layer of the bipolar membrane.

13. The apparatus as recited in claim 9 wherein the unit cell comprises:
at least one cation selective membrane serially aligned with the adjacent bipolar membrane and guard membrane, there being a base product compartment between said cation selective membrane and the adjacent membranes;
at least one anion selective membrane serially aligned with the adjacent bipolar membrane and guard membrane, there being an acid product compartment between said anion selective membrane and the last adjacent membranes; and
at least a portion of an aqueous salt solution feed compartment serially aligned with each product compartment with the ion selective means therebetween.

14. The apparatus as recited in claim 9 wherein there is a means to supply an electrical potential across said cell.

15. The apparatus as recited in claim 13 wherein the guard membrane is an anion selective membrane.

16. The apparatus as recited in claim 13 wherein the guard membrane is an cation selective membrane.

17. The apparatus as recited in claim 9 wherein there are at least two unit cells.

18. A unit cell comprising:
a bipolar membrane having a cation selective layer and an anion selective layer, and
at least one separate monopolar guard membrane adjacent to the bipolar membrane, the guard membrane being in contact with the bipolar membrane along a layer of the bipolar membrane selective to the same type of ions as the guard membrane.

19. The unit cell as recited in claim 18 further comprising:
at least one ion selective membrane serially aligned with the adjacent bipolar membrane and guard membrane, there being a product compartment between the ion selective membrane and the adjacent membrane; and
an aqueous salt solution feed compartment adjacent the product compartment with the ion selective membrane therebetween.

20. The unit cell as recited in claim 19 wherein the ion selective membrane is an anion selective membrane facing toward the cation layer of the bipolar membrane.

21. The unit cell as recited in claim 19 wherein the ion selective membrane is an cation selective membrane facing toward the anion layer of the bipolar membrane.

22. The unit cell as recited in claim 18 wherein the unit cell comprises:
at least one cation selective membrane serially aligned with the adjacent bipolar membrane and guard membrane, there being a base product compartment between said cation selective membrane and the adjacent membranes;
at least one anion selective membrane serially aligned with the adjacent bipolar membrane and guard membrane, there being an acid product compartment between said anion selective membrane and the last adjacent membrane; and
at least a portion of an aqueous salt solution feed compartment serially aligned with each product compartment with the ion selective means therebetween.

23. An improved method of electrodialytically treating an aqueous stream comprising electrolytes in an electrodialysis apparatus comprising at least one unit cell comprising at least one first membrane having at least one ion selective layer selected from the group consisting of anion selective layers and cation selective layers, wherein the improvement comprises placing at least one monopolar separate guard membrane adjacent to at least one first membrane, the guard membrane being in contact with the first membrane along a layer of the first membrane selective to the same type of ions as the guard membrane.

24. The method of claim 23 wherein the guard membrane is a monopolar membrane.

25. The method as recited in claim 24 wherein the guard membrane is an anion selective membrane.

26. The method as recited in claim 24 wherein the guard membrane is a cation selective membrane.

27. The method as recited in claim 23 wherein the first membrane is a bipolar membrane having a cation selective layer and an anion selective layer, the bipolar membrane being adjacent to at least one separate monopolar guard membrane.

28. The method as recited in claim 27 wherein the guard membrane is selected from the group consisting of anion and cation selective membrane.

29. The method as recited in claim 24 wherein first membrane is a cation selective membrane and the guard membrane is a cation selective membrane.

30. The method as recited in claim 24 wherein first membrane is a anion selective membrane and the guard membrane is an anion selective membrane.

* * * * *